(12) United States Patent
Johansson et al.

(10) Patent No.: US 7,834,115 B2
(45) Date of Patent: Nov. 16, 2010

(54) METHOD FOR PREPARING AN ETHYLENE-SILANE COPOLYMER

(75) Inventors: Kenneth Johansson, Stenungsund (SE); Roger Carlsson, Saeve (SE)

(73) Assignee: Borealis Technology Oy, Porvoo (FI)

( * ) Notice: Subject to any disclaimer, the term of this patent is extended or adjusted under 35 U.S.C. 154(b) by 544 days.

(21) Appl. No.: 11/940,764

(22) Filed: Nov. 15, 2007

(65) Prior Publication Data

US 2008/0132657 A1 Jun. 5, 2008

(30) Foreign Application Priority Data

Nov. 16, 2006 (EP) .................................. 06023851

(51) Int. Cl.
*C08F 2/01* (2006.01)
(52) U.S. Cl. .......................... 526/279; 526/64; 526/65; 526/72; 526/78; 526/86; 526/87; 526/88; 526/348
(58) Field of Classification Search ....................... None
See application file for complete search history.

(56) References Cited

U.S. PATENT DOCUMENTS

| | | | | |
|---|---|---|---|---|
| 3,225,018 A | * | 12/1965 | Zutty | ........................ 528/481 |
| 3,292,156 A | | 12/1966 | Stochel | |
| 3,392,156 A | * | 7/1968 | Donaldson | .................. 526/227 |
| 4,297,310 A | | 10/1981 | Akutsu et al. | |
| 4,351,876 A | * | 9/1982 | Doi et al. | .................... 428/349 |
| 4,397,981 A | | 8/1983 | Doi et al. | |
| 4,413,066 A | | 11/1983 | Isaka et al. | |
| 4,446,283 A | | 5/1984 | Doi et al. | |
| 4,456,704 A | | 6/1984 | Fukumura et al. | |
| 4,978,720 A | * | 12/1990 | Cozewith et al. | ............ 525/288 |
| 4,983,675 A | | 1/1991 | Ishino et al. | |
| 2005/0192414 A1 | * | 9/2005 | Donck et al. | .................. 526/64 |

FOREIGN PATENT DOCUMENTS

| | | |
|---|---|---|
| WO | 95/17463 | 6/1995 |
| WO | 95/17464 | 6/1995 |
| WO | 98/14516 | 4/1998 |
| WO | 00/36612 | 6/2000 |
| WO | 00/68314 | 11/2000 |
| WO | 00/68957 | 11/2000 |
| WO | 2005/023908 | 3/2005 |
| WO | 2005/041215 | 5/2005 |

OTHER PUBLICATIONS

Mark, Bikales, Overberger, Menges, Encyclopedia Of Polymer Science Ad Engineering, vol. 6, Ethylene Polymers, pp. 383 to 410, (1986).

* cited by examiner

*Primary Examiner*—Marc S Zimmer
(74) *Attorney, Agent, or Firm*—Roberts Mlotkowski Safran & Cole, P.C.

(57) ABSTRACT

The present invention relates to an improved method for preparing an ethylene-silane copolymer comprising hydrolysable silane groups by radical-initiated polymerisation of ethylene and an olefinically unsaturated silane compound, such as vinyl trimethoxysilane (VTMS). Said method is performed in a multi-zone reactor comprising two or more reaction zones, wherein advantageously essentially all of the silane compound is introduced into the first reaction zone to provide a higher conversion of silane monomer into polymer.

20 Claims, No Drawings

METHOD FOR PREPARING AN ETHYLENE-SILANE COPOLYMER

The present invention relates to a method for preparing an ethylene-silane copolymer comprising hydrolysable silane groups by radical-initiated polymerisation of ethylene and at least one monomer copolymerisable with ethylene and including an unsaturated silane compound at a pressure of 100-400 MPa and at a temperature of 80-350° C. in a multi-zone reactor comprising two or more reaction zones.

Electric cables and wires are generally composed of one or several polymer layers extruded around an electric conductor. For instance, in medium (>6 to 68 kV) and high voltage (>68 kV) power cables, the electric conductor is usually coated first with an inner semiconducting layer followed by an insulating layer, and then an outer semiconducting layer. To these layers further layers may be added, such as a water barrier layer and a surrounding sheath layer (jacketing layer) applied on the outside of the said layers.

The insulating layer and the semiconducting layers normally consist of a polymer composition comprising a crosslinked polyolefin. Crosslinking substantially contributes to improve such properties of the polymer as its mechanical strength, chemical, abrasion and heat resistance.

Common polymeric materials for wire and cable applications comprises ethylene homo- and/or copolymers and propylene homo- and/or copolymers, including ethylene-propylene-elastomers. Normally, the insulating layer and the semiconducting layer comprises crosslinked ethylene homo- and/or copolymers, herein referred to as ethylene (co)polymers. LDPE (low density polyethylene), i.e. polyethylene prepared by radical polymerisation at high pressure, crosslinked by adding peroxide, for instance dicumyl peroxide, is today the predominant cable insulating material for power cables.

Crosslinked polyolefins, such as crosslinked ethylene homo- and/or copolymers and propylene homo- and/or copolymers, are also extensively used for pipes, such as water pipes, gas pipes, sewage pipes, coated steel pipes and aluminium multilayer pipes.

Crosslinking can be brought about by adding free-radical-forming agents, such as peroxides, to the polymer composition prior to or during extrusion of the cable or pipe and the crosslinking is initiated by heating in a subsequent vulcanisation step, such that the peroxide is decomposed to form free radicals.

It is also known to crosslink polyolefins, such as polyethylene, by introducing crosslinkable groups, such as hydrolysable silane groups, in the polymer. This technique is previously known, and further details may be obtained from U.S. Pat. Nos. 3,225,018; 3,292,156; 4,413,066; 4,297,310; 4,351,876; 4,397,981; 4,446,283; and 4,456,704. As appears from the above patent specifications, polymer production involving grafting of the silane compound has its problems, both as regards the production itself and the properties of the material produced. These problems are counteracted by producing the crosslinkable silane polymer by copolymerisation.

The crosslinking of polymers with hydrolysable silane groups is carried out by so-called moisture curing. In a first step, the silane groups are hydrolysed under the influence of water or steam, resulting in the splitting-off of alcohol and the formation of silanol groups. In a second step, the silanol groups are crosslinked by a condensation reaction splitting off water. In both steps, a so-called silanol condensation catalyst is used as a catalyst. Silanol condensation catalysts include carboxylates of metals, such as tin, zinc, iron, lead and cobalt; organic bases; inorganic acids; and organic acids.

Water-crosslinkable silane-containing polyolefin compositions for cable and wire applications are, for instance, described in WO 95/17463, WO 95/17464, WO 98/14516, and WO 00/36612.

Water-crosslinkable silane-containing polyolefins can also be used in compositions for pipe applications as disclosed in WO 05/023908.

Compared to peroxide crosslinking which require separate processing steps for the compounding of additives and soaking of the peroxide crosslinking agent, water crosslinking requires none of these steps and therefore results in a more simple overall process with fewer processing steps. Thanks to fewer processing steps there is less risk of contaminating the composition which means a cleaner handling of the composition which is increasingly important the higher the intended voltage is of the cable. The crosslinking temperature is lower for water crosslinking than at peroxide crosslinking. Thus, while the temperature in a vulcanising tube is about 400° C. at peroxide crosslinking, the temperature in a vulcanising tube used for crosslinking of a silane group containing polymer composition is generally only about 170-190° C. or less. It is also possible to crosslink under ambient conditions, then no vulcanisation tube is needed in the process. Alternatively, a water bath or steam saunas can be used for crosslinking at temperatures of about 60-100° C. This lower crosslinking temperature means that less energy is consumed for water crosslinking than for peroxide crosslinking.

Polymerisation of ethylene (co)polymers by free radical initiated polymerisation at high pressure (referred to as high pressure radical polymerisation) is well-known in the art. Generally, the polymerisation is performed by reacting the monomers under the action of one or more radical initiators, such as peroxides, hydroperoxides, oxygen or azo compounds, in a reactor at a temperature of about 80-350° C. and at a pressure of about 100-400 MPa. The monomers are normally compressed in several stages up to the desired pressure before introduction into the reactor. Usually, the polymerisation is carried out continuously in either an autoclave or a tubular reactor. Monomer conversion is generally higher in a tubular reactor than in an autoclave. Besides, by polymerisation in a tubular reactor ethylene (co)polymers with a branching structure well-suited for crosslinking thereof can be provided.

Tubular reactors are either single-feed or multi-feed reactors, including split-feed reactors. In a single-feed tubular reactor (also referred to as front-feed reactor), the total monomer flow is fed to the inlet of the first reaction zone. In a multi-feed tubular reactor, the monomers are fed into the reactor at several locations along the reactor. In a split-feed reactor, the compressed monomer mixture are split into several streams and fed into the reactor at different locations thereof.

Reaction is started by injection of the radical initiator. The reaction mixture cools after the first reaction peak and additional initiator is added to start a second reaction zone. The number of initiator injection points determines the number of reaction zones. A tubular reactor for production of ethylene (co)polymers by high pressure radical polymerisation usually comprises a total of two to five reaction zones.

When the reaction is completed, the temperature and the pressure are lowered, typically in two steps using a high-pressure separator and a low-pressure separator. The resulting polymer is recovered and unreacted monomers are usually recycled back to the reactor.

Further details of the production of ethylene (co)polymers by high pressure radical polymerisation can be found in the Encyclopedia of Polymer Science and Engineering, Vol. 6 (1986), pp 383-410.

An example of commercially available moisture-curable ethylene-vinylsilane copolymer compositions is the ethylene-vinyltrimethoxysilane copolymer based compositions sold by Borealis AB under the trade name Visico™.

In order to have an economically efficient process it is normally necessary to recover unreacted ethylene and vinylsilane monomer and recycle it back to the polymerization reactor.

The vinylsilane monomer, such as vinyltrimethoxysilane, used in the production of said ethylene-vinylsilane copolymer costs significantly more than ethylene.

Accordingly, it would be advantageous if less vinylsilane monomer was required for said production. Thus, it is highly desirable to obtain a higher conversion of vinylsilane monomer to polymer to reduce the amount of vinylsilane monomer needed to achieve a certain degree of silane content in the resulting polymer.

Furthermore, if the total amount of vinylsilane monomer required to produce a certain amount of polymer is decreased, less energy would be required for compression of the vinylsilane monomer.

During recirculation of the unreacted monomers, waxes are formed on the inner surfaces of the recirculation pipes. The pipes are regularly cleaned to remove these waxes, which thereafter are burn. It has been found that if these waxes have a high content of vinylsilane monomer, they are more difficult to burn. For instance, plugging will occur in the combustion system.

The recirculation generally also leads to some monomer losses. Consequently, if less vinylsilane monomer is recycled, the losses thereof will also be reduced.

An object of the present invention is to alleviate the above problems and to provide an improved process for producing an ethylene-silane copolymer comprising hydrolysable silane groups. More specifically, an object is to provide a process for producing said ethylene-silane copolymer with an improved conversion of added silane monomer into polymer.

Therefore, according to the present invention a method is provided for preparing an ethylene-silane copolymer comprising hydrolysable silane groups by radical-initiated polymerisation of ethylene and at least one monomer including an olefinically unsaturated silane compound at a pressure of 100-400 MPa and at a temperature of 80-350° C. in a multi-zone reactor comprising two or more reaction zones, wherein more than 60% by weight of the total amount of silane compound added to the reactor is introduced into the first reaction zone of the reactor.

A preferred type of such a multi-zone reactor is e.g. a tubular reactor.

More specifically, more than 90% by weight of the silane compound is advantageously introduced into the first reaction zone of the reactor. Other features and advantages of the present invention will become apparent from the following description of the invention.

The invention relates to a method for preparing an ethylene-silane copolymer comprising hydrolysable silane groups by radical-initiated polymerisation of ethylene and at least one monomer copolymerisable with ethylene and including an olefinically, advantageously vinylically, unsaturated silane compound at a pressure of 100-400 MPa and at a temperature of 80-350° C., preferably 100-350° C., in a multi-zone reactor, such as a tubular reactor, comprising two or more reaction zones, wherein more than 60% by weight, of the total amount of silane compound added to the reactor is introduced into the first reaction zone of the reactor.

Preferably 70-100% by weight, in particular 80-100%, more specifically 90-100%, of the total amount of silane compound added to the reactor is introduced into the first reaction zone of the reactor.

It shall be noted that the above mentioned temperature range include the initiating temperature as well as the peak temperature.

Most advantageously, essentially all of the added silane compound is introduced into the first reaction zone of the reactor, i.e more than 90% by weight.

As used herein the term "essentially all" of monomer X means at least 90% by weight, more preferred at least 95% by weight and most preferred 99-100% by weight, of the total amount of monomer X added to the reactor.

In the best embodiment of the method according to the invention, all silane compound is introduced into the first reaction zone of the reactor.

It has been found that when a greater portion of the total amount of silane compound added to the reactor is introduced into the first reaction zone of the reactor, an increased conversion of added silane monomer into polymer, i.e. a better yield, is provided. The best yield is obtained when essentially all of the added silane compound is introduced into the first reaction zone of the reactor, i.e. by front-feeding the silane monomer into the reactor.

The ethylene can either be introduced into the reactor by front-feeding (i.e. essentially all ethylene is introduced into the first reaction zone of the reactor) or by multi-feeding (i.e. ethylene is fed into two reaction zones or more).

In comparison to front-feeding of ethylene, split-feeding of ethylene provides a higher conversion of ethylene monomer into polymer by high pressure radical polymerisation thereof in a tubular reactor.

In particular, the unsaturated silane compound is a compound represented by the formula

wherein R is an ethylenically unsaturated hydrocarbyl, hydrocarbyloxy or (meth)acryloxy hydrocarbyl group, R' is an aliphatic saturated hydrocarbyl group, Y is a hydrolysable organic group, and n is 0, 1 or 2. If there is more than one Y group, these do not have to be identical.

Special examples of the unsaturated silane compound are those wherein R is vinyl, allyl, isopropenyl, butenyl, cyclohexenyl or gamma-(meth)acryloxy propyl; Y is methoxy, ethoxy, formyloxy, acetoxy, propionyloxy or an alkyl- or arylamino group; and R', if present, is a methyl, ethyl, propyl, decyl or phenyl group.

More specifically, the unsaturated silane compound is a compound represented by the formula

wherein A is a hydrocarbyl group having 1-8 carbon atoms, in particular 1-4 carbon atoms.

Examples of suitable unsaturated silane compounds are vinyl trimethoxysilane, vinyl dimethoxyethoxy silane, vinyl triethoxysilane, gamma-(meth)acryloxypropyltri-methoxysilane, gamma(meth)acryloxypropyltriethoxysilane, vinyl triacetoxysilane, and any combinations thereof.

It has been found suitable that the ethylene-silane copolymer produced by said method comprises 0.001-15% by weight of the silane compound, in particular 0.01-5% by weight, more particularly 0.1-3% by weight.

The copolymerisation of the ethylene and the unsaturated silane compound may be carried out under any suitable conditions resulting in the copolymerisation of the two monomers.

Moreover, the copolymerisation may be implemented in the presence of one or more other comonomers which can be copolymerised with the two monomers. Such olefinically, advantageously vinylically, unsaturated comonomers include (a) vinyl carboxylate esters, such as vinyl acetate and vinyl pivalate, (b) alpha-olefins, such as propene, 1-butene, 1-hexene, 1-octene and 4-methyl-1-pentene, (c) (meth)acrylates, such as methyl(meth)acrylate, ethyl(meth)acrylate and butyl (meth)acrylate, (d) olefinically unsaturated carboxylic acids, such as (meth)acrylic acid, maleic acid and fumaric acid, (e) (meth)acrylic acid derivatives, such as (meth)acrylonitrile and (meth)acrylic amide, (f) vinyl ethers, such as vinyl methyl ether and vinyl phenyl ether, and (g) aromatic vinyl compounds, such as styrene and alpha-methyl styrene.

The copolymerisation with other comonomers besides the unsaturated silane comonomer is applied in particular when it is desired to make a crosslinkable polymer composition hydrophilic and/or amorphous, for instance in order to facilitate the migration of water into it. In that case the comonomer (or termonomer) should include at least one polar group, such as a siloxane, an amide, an anhydride, a carboxylic, a carbonyl, an acyl, a hydroxyl or an ester group.

Examples of such comonomers include group (a), (c), (d), (e), and (f) mentioned above.

Amongst these comonomers, vinyl esters of monocarboxylic acids having 1-4 carbon atoms, such as vinyl acetate, and (meth)acrylate of alcohols having 1-4 carbon atoms, such as methyl(meth)acrylate, are preferred. Especially preferred comonomers are butyl acrylate, ethyl acrylate and methyl acrylate. Two or more such olefinically unsaturated compounds may be used in combination. As used herein, the term "(meth)acrylic acid" is meant to encompass acrylic acid as well as methacrylic acid.

The comonomer content of the copolymer may amount to 80% by weight of the copolymer, in particular about 0.5-35% by weight, more particularly about 1-30% by weight.

Said additional comonomer(s), i.e. besides ethylene and unsaturated silane compound, can be introduced into the reactor either by front-feeding in a single stream or multi-feeding in two of more streams, including split-feeding thereof.

In an embodiment where the additional comonomer is a (meth)acrylate, such as butylacrylate, it is preferred to introduce essentially all the (meth)acrylate into the first reaction zone of the tubular reactor, i.e. by front-feeding thereof. A theory is that terpolymer produced by front-feeding silane monomer and (meth)acrylate and front- or split-feeding ethylene to the reactor will have a more heterogeneous distribution of (meth)acrylate units than a corresponding terpolymer produced by split-feeding of the (meth)acrylate. It is believed that a composition comprising said terpolymer will exhibit a more rapid absorption and migration of water which will facilitate cross-linking thereof. Reference is made to WO 00/36612 wherein it is described that incorporation of comonomers containing polar functions, such as butyl acrylate, facilitates migration of water into a composition containing the polymer.

Other references describing terpolymers of ethylene, butyl acrylate and VTMS are WO 95/17463, WO 98/14516, WO 00/68314, WO 00/68957, WO 05/041215 and U.S. Pat. No. 4,983,675.

The ethylene-silane copolymer produced according to the method of the invention can be cross-linked by subjecting the copolymer to water in the presence of a silanol condensation catalyst.

Thus, the ethylene-silane copolymer produced according to the method of the invention can be used in a water-crosslinkable composition further comprising at least one silanol condensation catalyst.

Examples of suitable silanol condensation catalysts are carboxylates (carboxylic acid salts) of metals, such as tin, zinc, iron, lead and cobalt; organic bases; inorganic acids; and organic acids.

Special examples of such silanol condensation catalysts are dibutyltin dilaurate (DBTL), dibutyltin diacetate, dioctyltin dilaurate, stannous acetate, stannous caprylate, lead naphthenate, zinc caprylate, cobalt naphthenate, ethyl amines, dibutyl amines, hexyl amines and pyridine.

Further suitable silanol condensation catalysts comprise Lewis acids, inorganic acids such as sulphuric acid and hydrochloric acid, and organic acids such as maleic acid, citric acid, stearic acid, acetic acid, sulphonic acids and alkanoic acids as dodecanoic acid, or a precursor of any of the compounds mentioned.

Preferably, a Brönsted acid, or a precursor thereof, is used as acidic silanol condensation catalysts, further preferred a sulphonic acid, and still further preferred an organic sulphonic acid.

Still more preferably, the Brönsted acid is an organic sulphonic acid comprising 10 C-atoms or more, more preferably 12 C-atoms or more, and most preferably 14 C-atoms or more, the sulphonic acid further comprising at least one aromatic group which may e.g. be a benzene, naphthalene, phenantrene or anthracene group. In the organic sulphonic acid, one, two or more sulphonic acid groups may be present, and the sulphonic acid group(s) may either be attached to a non-aromatic, or preferably to an aromatic group, of the organic sulphonic acid.

Further preferred, the aromatic organic sulphonic acid comprises the structural element:

$$Ar(SO_3H)_x$$

with Ar being an aryl group which may be substituted or non-substituted, and x being at least 1.

The organic aromatic sulphonic acid silanol condensation catalyst may comprise the structural unit according to the formula one or several times, e.g. two or three times. For example, two structural units according to the formula may be linked to each other via a bridging group such as an alkylene group.

Preferably, Ar is an aryl group which is substituted with at least one $C_4$- to $C_{30}$-hydrocarbyl group, more preferably $C_4$- to $C_{30}$-alkyl group.

Aryl group Ar preferably is a phenyl group, a naphthalene group or an aromatic group comprising three fused rings such as phenantrene and anthracene.

Preferably, in the formula x is 1, 2 or 3, and more preferably x is 1 or 2.

Furthermore, preferably the compound used as organic aromatic sulphonic acid silanol condensation catalyst has from 10 to 200 C-atoms, more preferably from 14 to 100 C-atoms.

It is further preferred that Ar is a hydrocarbyl substituted aryl group and the total compound containing 14 to 28 carbon atoms, and still further preferred, the Ar group is a hydrocarbyl substituted benzene or naphthalene ring, the hydrocarbyl radical or radicals containing 8 to 20 carbon atoms in the benzene case and 4 to 18 atoms in the naphthalene case.

It is further preferred that the hydrocarbyl radical is an alkyl substituent having 10 to 18 carbon atoms and still more preferred that the alkyl substituent contains 12 carbon atoms and is selected from dodecyl and tetra-propyl. Due to commercial availability it is most preferred that the aryl group is a benzene substituted group with an alkyl substituent containing 12 carbon atoms.

The currently most preferred compounds are dodecyl benzene sulphonic acid and tetrapropyl benzene sulphonic acid.

The silanol condensation catalyst may also be precursor of the sulphonic acid compound, including all its preferred embodiments mentioned, i.e. a compound that is converted by hydrolysis to such a compound. Such a precursor is for example the acid anhydride of a sulphonic acid compound, or a sulphonic acid that has been provided with a hydrolysable protective group, as e.g. an acetyl group, which can be removed by hydrolysis.

Furthermore, preferred sulphonic acid catalysts are those as described in EP 1 309 631 and EP 1 309 632, namely a) a compound selected from the group of
(i) an alkylated naphthalene monosulfonic acid substituted with 1 to 4 alkyl groups wherein each alkyl group is a linear or branched alkyl with 5 to 40, preferably 5 to 20 carbons with each alkyl group being the same or different and wherein the total number of carbons in the alkyl groups is in the range of 20 to 80 carbons;
(ii) an arylalkyl sulfonic acid wherein the aryl is phenyl or naphthyl and is substituted with 1 to 4 alkyl groups wherein each alkyl group is a linear or branched alkyl with 5 to 40, preferably 5 to 20 carbons with each alkyl group being the same or different and wherein the total number of carbons in the alkyl groups is in the range of 12 to 80;
(iii) a derivative of (i) or (ii) selected from the group consisting of an anhydride, an ester, an acetylate, an epoxy blocked ester and an amine salt thereof which is hydrolysable to the corresponding alkyl naphthalene monosulfonic acid or the arylalkyl sulfonic acid;
(iv) a metal salt of (i) or (ii) wherein the metal ion is selected from the group consisting of copper, aluminium, tin and zinc; and b) a compound selected from the group of
(i) an alkylated aryl disulfonic acid selected from the group consisting of the structure:

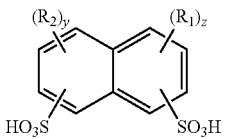

and the structure:

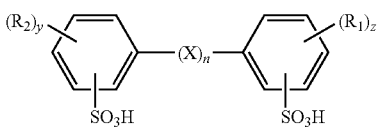

wherein each of $R_1$ and $R_2$ is the same or different and is a linear or branched alkyl group with 6 to 16 carbons, y is 0 to 3, z is 0 to 3 with the proviso that y+z is 1 to 4, n is 0 to 3, X is a divalent moiety selected from the group consisting of —C($R_3$)($R_4$)—, wherein each of $R_3$ and $R_4$ is H or independently a linear or branched alkyl group of 1 to 4 carbons and n is 1; —C(=O)—, wherein n is 1; —S—, wherein n is 1 to 3 and —S(O)$_2$—, wherein n is 1; and
(ii) a derivative of (i) selected from the group consisting of the anhydrides, esters, epoxy blocked sulfonic acid esters, acetylates, and amine salts thereof which is a hydrolysable to the alkylated aryl disulfonic acid, together with all preferred embodiments of those sulphonic acids as described in the mentioned European Patents.

According to the teachings of WO 95/17464 a silanol condensation catalyst comprising an organic tin compound of formula I or II is advantageous to use.

$$RS_n(OH)_hX_j \qquad (I)$$

$$RS_n(OH)_kX_lOS_n(OH)_mX_nR' \qquad (II)$$

wherein R and R' are hydrocarbon radicals, such as butyl and octyl, R' being the same as or different from R, X is a halogen, such as fluorine, chlorine, bromine and iodine, h is 1 or 2, j is 1 or 2, h+j=3, k, l, m and n are 0, 1 or 2, k+1=2, m+n=2 and at least one of l and n is different from 0.

Preferably, the silanol condensation catalyst is present in an amount of 0.0001 to 6 wt %, more preferably of 0.001 to 2 wt %, and most preferably 0.02 to 0.5 wt % of the polyolefin composition.

Said composition may contain 0.0001-3% by weight of the silanol condensation catalyst(s).

As is usually the case for polymer compositions, the water-crosslinkable polymer composition may contain various additives, such as miscible thermoplastics, stabilisers, lubricants, fillers, colouring agents, foaming agents, and precuring retarders.

As to the miscible thermoplastics added, mention may be made of miscible polyolefins, such as polyethylene of low density, medium density and high density, polypropylene, chlorinated polyethylene, as well as various copolymers including ethylene and one or more other comonomers, e.g. vinyl acetate, methyl acrylate, propene, butene, hexene and the like. One may use either a single polyolefin or a mixture of several polyolefins. The polyolefin content of the composition may be up to 70% by weight, as based on the total amount of this polyolefin and the silane-containing polymer.

As to fillers, mention may be made of inorganic fillers, such as silicates, e.g. kaolin, talc, montmorillonite, zeolite, mica, silica, calcium silicate, asbestos, powdered glass, glass fibre, calcium carbonate, gypsum, magnesium carbonate; magnesium hydroxide, aluminium hydroxide, carbon black and titanium oxide. The content of the inorganic filler may be up to 60% by weight, as based on the sum of the weights of the filler and the silane-containing polymer.

The above described water-crosslinkable polymer composition can, for instance, be used in the manufacturing of cables and wires. For instance, said composition can be used for manufacturing an insulating layer and/or a semiconducting layer in a cable. In order to obtain the electrical conductivity required and make the composition semiconducting, carbon black in the order of approximately 20-50% by weight is added to the composition. Reference is made to WO 98/14516 which discloses such compositions.

Other applications for the composition may, however, also be contemplated such as pipes, particularly water pipes and gas pipes, and products made by injection or rotational moulding. Reference is made to EP 1512711 which discloses a water-crosslinkable composition useful for the manufacturing of a pipe having a hydrostatic pressure resistance at 95° C. of at least 2.8 MPa.

The invention will now be illustrated by means of the following non-limiting examples.

EXAMPLES

Comparison Example 1

An ethylene-vinyltrimethoxysilane copolymer was produced by radical polymerisation in a tubular reactor.

The pressure in the reactor was 2200-2300 kPa and the reaction temperature was within the range 120-320° C.

An organic peroxide was used as radical initiator.
Methyl-ethyl ketone was used as chain-transfer agent.
The reactor contained two reaction zones.
The reactor was supplied with 31 000 kg ethylene/h and 150 kg VTMS/h.

Each monomer stream was supplied to a compressor and compressed.

50% by weight of the ethylene (i.e. 15 500 kg ethylene/h) was fed to the first reaction zone and 50% by weight was fed to the second reaction zone.

60% by weight of the VTMS (i.e. 90 kg VTMS/h) was fed to the first reaction zone and 40% by weight of the VTMS (i.e. 60 kg VTMS/h) was fed to the second reaction zone.

The polymerisation yielded 7 200 kg polymer/h.

The chain transfer agent was added in such an amount that the copolymer formed had a melt flow rate (MFR) of 0.9 g/10 min, measured according to ISO 1133.

The density of the polymer produced was 923 kg/m$^3$, measured according to ISO 1183:1987-D.

When analysed by FTIR, the copolymer was found to have a VTMS content of about 1.9% by weight.

This means that about 90.9% of the VTMS supplied to the reactor was copolymerised and thus converted into said copolymer. This means that 13.8 kg VTMS/h was unreacted. Thus, 1.91 kg VTMS per 1 000 kg produced polymer was unreacted.

Example 1

An ethylene-vinyltrimethoxysilane copolymer was produced by radical polymerisation in a tubular reactor.

The pressure in the reactor was 2200-2300 kPa and the reaction temperature was within the range 120-320° C. The temperature profile in the reactor was similar to the one used in Comparison Example 1.

An organic peroxide was used as radical initiator.
Methyl-ethyl ketone was used as chain-transfer agent.
The reactor contained two reaction zones.
The reactor was supplied with 31 000 kg ethylene/h and 147 kg VTMS/h.

Each monomer stream was supplied to a compressor and compressed.

50% by weight of the ethylene (i.e. 15 500 kg ethylene/h) was fed to the first reaction zone and 50% by weight was fed to the second reaction zone.

100% by weight of the VTMS (i.e. 147 kg VTMS/h) was fed to the first reaction zone.

The polymerisation yielded 7 200 kg polymer/h.

The chain transfer agent was added in such an amount that the copolymer formed had a melt flow rate (MFR) of 0.9 g/10 min, measured according to ISO 1133.

The density of the polymer produced was 923 kg/m$^3$, measured according to ISO 1183:1987-D.

When analysed by FTIR, the copolymer was found to have a VTMS content of about 1.9% by weight.

This means that about 93.3% of the VTMS supplied to the reactor was copolymerised and thus converted into said copolymer. This means that only 9.8 kg VTMS/h was unreacted. Thus, 1.36 kg VTMS per 1 000 kg produced polymer was unreacted, which is 0.55 kg VTMS/ton polymer less than in Comparison Example 1.

Comparison Example 2

Comparison Example 1 was repeated except that the reactor was supplied with 31 000 kg ethylene/h and 104 kg VTMS/h.

The polymerisation yielded 7 250 kg polymer/h.

The chain transfer agent was added in such an amount that the copolymer formed had a melt flow rate (MFR) of 1.0 g/10 min, measured according to ISO 1133.

The density of the polymer produced was 923 kg/m$^3$, measured according to ISO 1183:1987-D.

When analysed by FTIR, the copolymer was found to have a VTMS content of about 1.3% by weight.

This means that about 90.6% of the VTMS supplied to the reactor was copolymerised and thus converted into said copolymer. This means that 9.8 kg VTMS/h was unreacted. Thus, 1.35 kg VTMS per 1000 kg produced polymer was unreacted.

Example 2

Example 1 was repeated except that the reactor was supplied with 31 000 kg ethylene/h and 101 kg VTMS/h.

The temperature profile in the reactor was similar to the one used in Comparison Example 2.

The polymerisation yielded 7 250 kg polymer/h.

The chain transfer agent was added in such an amount that the copolymer formed had a melt flow rate (MFR) of 1.0 g/10 min, measured according to ISO 1133.

The density of the polymer produced was 923 kg/m$^3$, measured according to ISO 1183:1987-D.

When analysed by FTIR, the copolymer was found to have a VTMS content of about 1.3% by weight.

This means that about 93.0% of the VTMS supplied to the reactor was copolymerised and thus converted into said copolymer. This means that 7.1 kg VTMS/h was unreacted. Thus, 0.98 kg VTMS per 1 000 kg produced polymer was unreacted, which is 0.37 kg VTMS/ton polymer less than in Comparison Example 2.

Comparison Example 3

Comparison Example 1 was repeated except that the reactor was supplied with 31 000 kg ethylene/h and 86 kg VTMS/h.

The polymerisation yielded 5 100 kg polymer/h.

The chain transfer agent was added in such an amount that the copolymer formed had a melt flow rate (MFR) of 1.0 g/10 min, measured according to ISO 1133.

The density of the polymer produced was 930 kg/m$^3$, measured according to ISO 1183:1987-D.

When analysed by FTIR, the copolymer was found to have a VTMS content of about 1.3% by weight.

This means that about 77.1% of the VTMS supplied to the reactor was copolymerised and thus converted into said copolymer. This means that 19.7 kg VTMS/h was unreacted. Thus, 3.86 kg VTMS per 1 000 kg produced polymer was unreacted.

Example 3

Example 1 was repeated except that the reactor was supplied with 31 000 kg ethylene/h and 82 kg VTMS/h.

The temperature profile in the reactor was similar to the one used in Comparison Example 3.

The polymerisation yielded 5 082 kg polymer/h.

The chain transfer agent was added in such an amount that the copolymer formed had a melt flow rate (MFR) of 1.0 g/10 min, measured according to ISO 1133.

The density of the polymer produced was 930 kg/m$^3$, measured according to ISO 1183:1987-D.

When analysed by FTIR, the copolymer was found to have a VTMS content of about 1.3% by weight.

This means that about 80.4% of the VTMS supplied to the reactor was copolymerised and thus converted into said copolymer. This means that 16.1 kg VTMS/h was unreacted. Thus, 3.16 kg VTMS per 1 000 kg produced polymer was unreacted, which is 0.70 kg VTMS/ton polymer less than in Comparison Example 3.

While the invention has been described in detail and with reference to specific embodiments thereof, it will be apparent for one skilled in the art that various changes and modifications can be made therein without departing from the spirit and scope thereof.

The invention claimed is:

1. A method for preparing an ethylene-silane copolymer comprising hydrolysable silane groups by radical-initiated polymerization of ethylene and at least one monomer including an olefinically unsaturated silane compound at a pressure of 100-400 MPa and at a temperature of 80-350° C. in a multi-zone reactor comprising two or more reaction zones, characterized in that more than 60% by weight of the total amount of silane compound added to the reactor is introduced into the first reaction zone of the reactor.

2. A method according to claim 1, wherein more than 90% by weight of the silane compound is introduced into the first reaction zone of the reactor.

3. A method according to claim 1, wherein the multi-zone reactor is a tubular reactor.

4. A method according to claim 1, wherein the amount of ethylene fed to any of the reaction zones is not more than 60% by weight of the total amount of ethylene fed to all reaction zones.

5. A method according to claim 1, wherein the ethylene is introduced into at least two reaction zones of the reactor.

6. A method according to claim 1, wherein the unsaturated silane compound is a compound represented by the formula $$RSir'_nY_{3-n}$$

wherein R is an ethylenically unsaturated hydrocarbyl, hydrocarbyloxy or (meth)acryloxy hydrocarbyl group, R' is an aliphatic saturated hydrocarbyl group, Y is a hydrolysable organic group, and n is 0, 1 or 2.

7. A method according to claim 1, wherein the unsaturated silane compound is a compound represented by the formula $$CH_2=CHSi(OA)_3$$

wherein A is a hydrocarbyl group having 1-8 carbon atoms.

8. A method according to claim 1, wherein the unsaturated silane compound is selected from the group consisting of vinyl trimethoxysilane, vinyl dimethoxyethoxy silane, vinyl triethoxysilane, gamma-(meth)acryloxypropyltrimethoxysilane, gamma(meth) acryloxypropyltriethoxysilane, vinyl triacetoxysilane, and any combinations thereof.

9. A method according to claim 1, wherein the ethylene-silane copolymer comprises 0.001-15% by weight of the silane compound.

10. A method according to claim 1, wherein ethylene is copolymerized with said unsaturated silane compound and at least one more olefinically unsaturated monomer.

11. A method according to claim 10, wherein said olefinically unsaturated monomer(s) is(are) selected from the group consisting of vinyl carboxylate esters; alpha-olefins; (meth) acrylates; olefinically unsaturated carboxylic acids; (meth) acrylic acid derivatives; vinyl ethers; aromatic vinyl compounds and any combination thereof.

12. A method according to claim 10, wherein said olefinically unsaturated monomer includes a polar group.

13. A method according to claim 12, wherein said olefinically unsaturated monomer is an alkyl(meth)-acrylate.

14. A method according to claim 10, wherein essentially all of the olefinically unsaturated monomer is introduced into the first reaction zone of the reactor.

15. A method according to claim 8, wherein ethylene is copolymerized with said unsaturated silane compound and at least one more olefinically unsaturated monomer.

16. A method according to claim 15, wherein said olefinically unsaturated monomer(s) is(are) selected from the group consisting of vinyl carboxylate esters; alpha-olefins; (meth) acrylates; olefinically unsaturated carboxylic acids; (meth) acrylic acid derivatives; vinyl ethers; aromatic vinyl compounds and any combination thereof.

17. A method according to claim 15, wherein said olefinically unsaturated monomer includes a polar group.

18. A method according to claim 17, wherein said olefinically unsaturated monomer is an alkyl(meth)-acrylate.

19. A method according to claim 18, wherein essentially all of the olefinically unsaturated monomer is introduced into the first reaction zone of the reactor 20. A method according to claim 15, wherein essentially all of the olefinically unsaturated monomer is introduced into the first reaction zone of the reactor.

* * * * *